(12) United States Patent
Amir

(10) Patent No.: US 7,472,810 B2
(45) Date of Patent: Jan. 6, 2009

(54) DOSING DISPENSER PARTICULARLY USEFUL FOR DISPENSING BABY FORMULA

(76) Inventor: Tal Amir, 5 Kapach Street, Holon (IL) 58248

( * ) Notice: Subject to any disclaimer, the term of this patent is extended or adjusted under 35 U.S.C. 154(b) by 603 days.

(21) Appl. No.: 11/125,181

(22) Filed: May 10, 2005

(65) Prior Publication Data

US 2006/0255074 A1    Nov. 16, 2006

(51) Int. Cl.
G01F 11/10    (2006.01)
(52) U.S. Cl. .................. 222/361; 222/275; 222/197; 222/428
(58) Field of Classification Search ........... 222/361, 222/336, 339, 344, 216, 217, 197, 195, 275, 222/276, 278, 282, 287, 288, 305, 307, 156–158, 222/425, 426, 431, 432, 447, 456, 459, 444, 222/347, 351, 366, 438, 440, 449, 450, 408.5, 222/226–248, 428, 429; 116/308
See application file for complete search history.

(56) References Cited

U.S. PATENT DOCUMENTS

| | | | | |
|---|---|---|---|---|
| 13,975 | A * | 12/1855 | Templeton | ............ 604/38 |
| 464,823 | A * | 12/1891 | Foster | ............ 222/181.2 |
| 470,018 | A * | 3/1892 | Strong | ............ 222/130 |
| 604,748 | A | 5/1898 | Guttenberg | |
| 1,471,621 | A | 10/1923 | McCord | |
| 1,753,278 | A | 8/1930 | Westberg et al. | |
| 2,046,068 | A | 6/1936 | Gray | |
| 2,983,408 | A * | 5/1961 | Schwartz | ............ 222/284 |
| 3,185,190 | A * | 5/1965 | Crawford | ............ 141/360 |
| 3,193,159 | A | 7/1965 | Swindler | |
| 3,286,886 | A * | 11/1966 | Burgess, Jr. | ............ 222/196 |
| 3,537,623 | A | 11/1970 | Fisher | |
| 3,750,722 | A | 8/1973 | Nowak | |
| 3,955,718 | A * | 5/1976 | Von Holdt et al. | ............ 222/197 |
| 4,186,646 | A | 2/1980 | Martin | |
| 5,183,507 | A * | 2/1993 | Scherer | ............ 118/18 |
| RE34,382 | E * | 9/1993 | Newman | ............ 222/307 |
| 5,462,101 | A | 10/1995 | Mouchmouchian | |
| 5,758,803 | A * | 6/1998 | Liao et al. | ............ 222/440 |
| 5,855,300 | A * | 1/1999 | Malki | ............ 222/153.09 |
| 6,523,723 | B1 | 2/2003 | Ekström | |
| 2004/0031819 | A1 * | 2/2004 | Smiley | ............ 222/449 |

* cited by examiner

Primary Examiner—Kevin P Shaver
Assistant Examiner—Stephanie E Tyler

(57) ABSTRACT

A dosing dispenser for dispensing predetermined quantities of a flowable material, particularly baby formula, includes a dosing device having a dosing compartment located to align its upper end with a receptacle for the flowable material, when the dosing device is in a rear limit position, for filling with the flowable material, and to align its lower end with a dispensing outlet when the dispensing device is in a forward limit position for dispensing the flowable material in the dosing compartment from the housing. The dispenser further includes a restraining device for restraining movement of the dosing device, when starting a movement in one direction, against movement in the opposite direction until the dosing device has completed its movement in the one direction, to thereby prevent dispensing of less than the predetermined quantity of the flowable material by only a partial filling of the dosing compartment. A vibratory action is produced when the dosing device is proved in either direction to enhance the flow of the flowable material into and out of the dosing compartment.

19 Claims, 10 Drawing Sheets

DOSING DISPENSER PARTICULARLY USEFUL FOR DISPENSING BABY FORMULA

FIELD AND BACKGROUND OF THE INVENTION

The present invention relates to dosing dispensers for dispensing predetermined quantities of a flowable material. The invention is particularly useful for dispensing predetermined quantities of a baby formula into a baby bottle, and is therefore described below with respect to such an application, but it will be appreciated that the invention could advantageously be used in many other applications as well.

Many constructions of dosing dispensers are known for dispensing predetermined quantities of flowable materials, as described for example in U.S. Pat. Nos. 1,471,621, 2,046,068, 3,193,159, 4,186,646 and 5,462,101. However, the known constructions generally suffer from one or more of the following drawbacks: Some constructions do not prevent the user from accidentally dispensing less than the desired predetermined quantity of flowable material. Others do not assure complete filling and/or complete emptying of their respective dosing compartments. Still others do not provide the user with the possibility of dispensing more than one predetermined quantity of flowable material. Many others are of a construction difficult to produce and/or to keep clean. Such drawbacks generally make the known dosage dispenser constructions relatively unsuitable for use to dispense baby formula.

OBJECTS AND BRIEF SUMMARY OF THE PRESENT INVENTION

An object of the present invention is to provide a dosing dispenser having advantages in one or more of the above respects. Another object of the invention is to provide a dosing dispenser particularly, but not exclusively, useful for dispensing baby formula.

The present invention relates to the type of dosing dispensers for dispensing predetermined quantities of a flowable material which comprises a housing for receiving a bulk quantity of the flowable material having a flow passageway for the flowable material; and a dosing device underlying the flow passageway and manually movable from a first limit position to a second limit position, and then movable back to the first limit position. This type of dosing dispenser further includes a dosing compartment located to align its upper end with the flow passageway of the housing when the dosing device is in the second limit position for filling with the flowable material, and to dispense the flowable material from the housing through the lower end of the dosing compartment when the dosing device is moved back to the first limit position. A dosing dispenser of the foregoing construction will hereinafter be referred to as "a dosing dispenser of the character described".

According to one aspect of the present invention, there is provided a dosing dispenser of the character described, wherein the dispenser further comprises a restraining device effective, when the dosing device has been moved away from the first limit position towards the second limit position, to restrain a return movement of the dosing device back to the first limit position until the dosing device has first completed its movement to the second limit position, to thereby prevent dispensing less than the predetermined quantity of the flowable material by only a partial filling of the dosing compartment.

According to another aspect of the present invention, there is provided a dosing dispenser of the character described, wherein the dispenser further comprises a vibrator device effective to vibrate the housing by the movement of the dosing device between its limit positions so as to enhance the flow of the flowable material into and out of the dosing compartment.

According to a still further aspect of the present invention, there is provided a dosing dispenser of the character described, wherein the dispenser further comprises a second dosing device contiguous to one side of the first-mentioned dosing device, the second dosing device including a second dosing compartment, and a projection engageable with the first-mentioned dosing device during the movement of the second dosing device from the first limit position to the second limit position, such that manually moving the first-mentioned dosing device dispenses only the quantity of flowable material in the dosing compartment of the first-mentioned dosing device, whereas manually moving the second dosing device dispenses the quantity of flowable material in the dosing compartments of both dosing devices.

The foregoing features of the present invention make the invention particularly useful in dosing dispensers for dispensing baby formula as well as other types of flowable materials.

Further features and advantages of the invention will be apparent from the description below.

BRIEF DESCRIPTION OF THE DRAWINGS

The invention is herein described, by way of example only, with references to the accompanying drawings, wherein.

Figure 1:
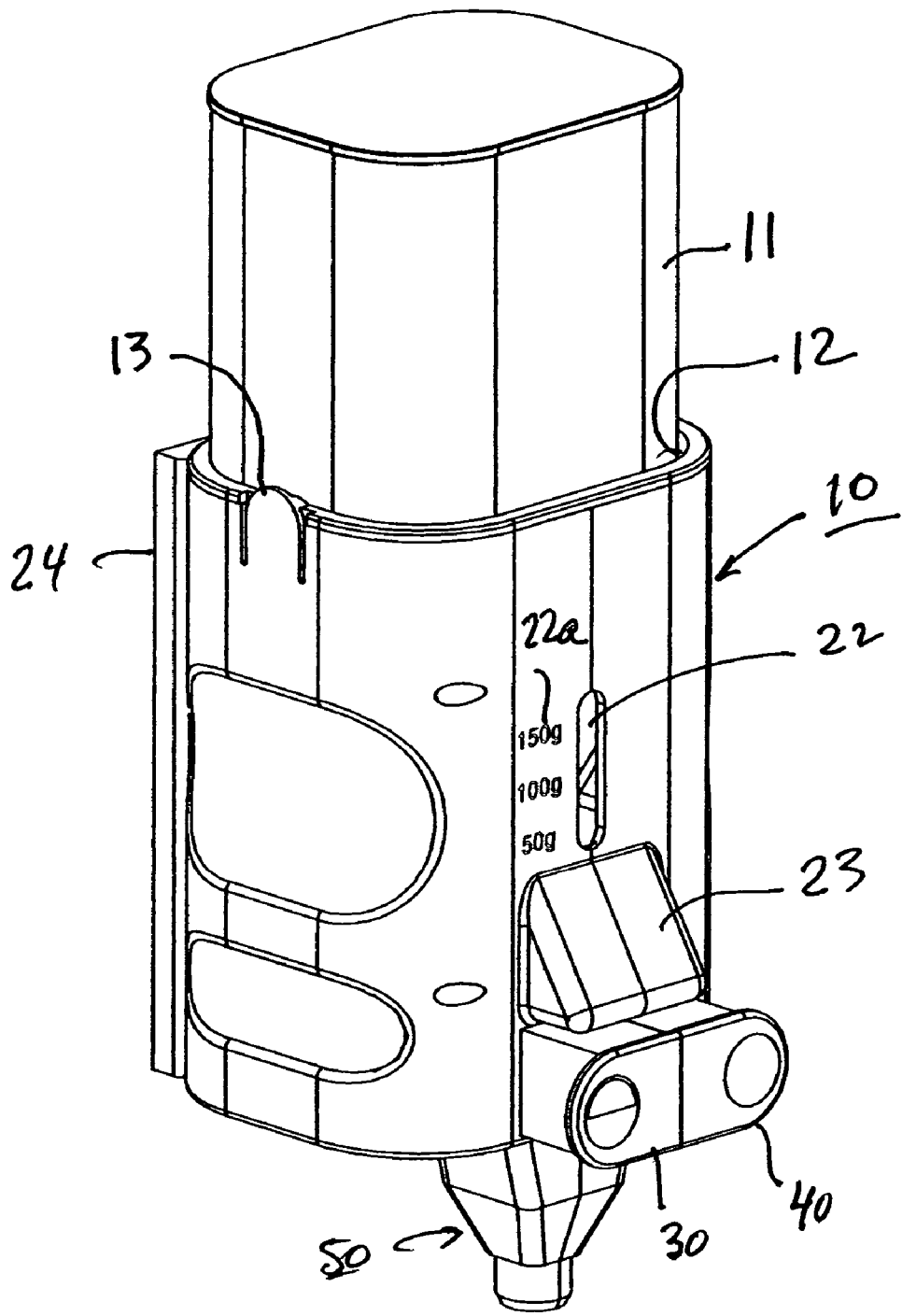
FIGS. 1 and 2 are isometric and side views, respectively, illustrating one form of dosing dispenser constructed in accordance with the present invention.
Figure 2:
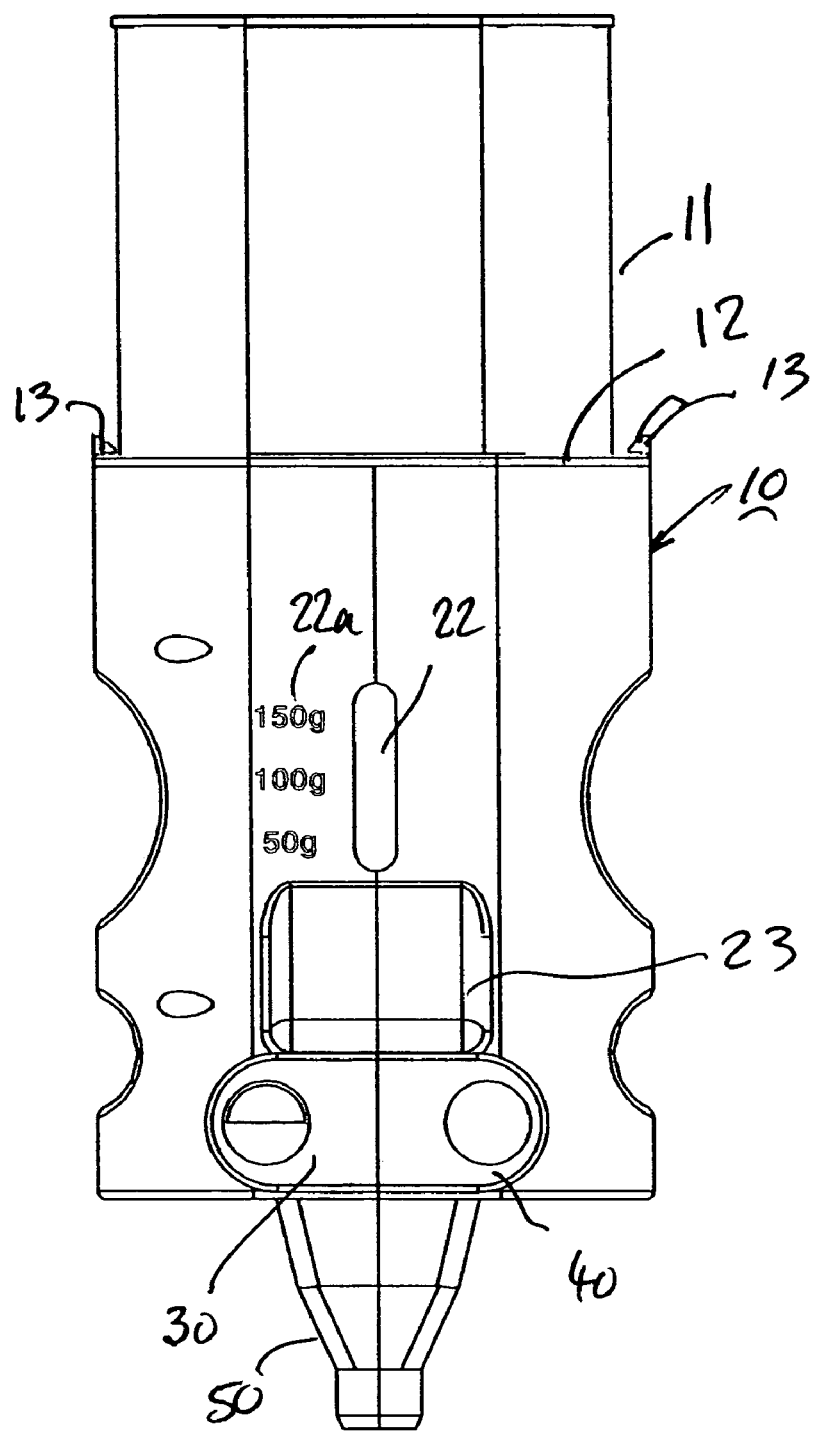

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF A PREFERRED EMBODIMENT

The dosing device illustrated in the drawings is particularly useful for dispensing predetermined quantities of baby formula into a baby bottle, but could be used for dispensing other flowable materials, e.g. powdered soap, sugar, coffee, etc.

The illustrated disposing dispenser includes a housing, generally designated 10, for receiving a receptacle 11 containing a bulk quantity of the flowable material, e.g. baby formula in powder form. In this case, receptacle 11 may be the original package in which the baby formula is sold to the consumer. Preferably, it is held in a holder 12 which is releasably retained within housing 10 by a pair of spring clips 13 at the opposite sides of the housing engageable with the upper edge of the holder.

The interior of housing 10 includes two vertically-spaced horizontal walls, 14, 15 (e.g. FIG. 3), each formed with a cut-out 14a, 15a, for receiving the lower end of holder 12. The interior of housing 10 includes a further horizontal wall 16 underlying wall 15. Wall 16 is formed with a first cut-out 16a at the rear side of the housing (the side facing away from the user), and with a second cut-out 16b at the front side of the housing (the side facing the user).

Figure 3:
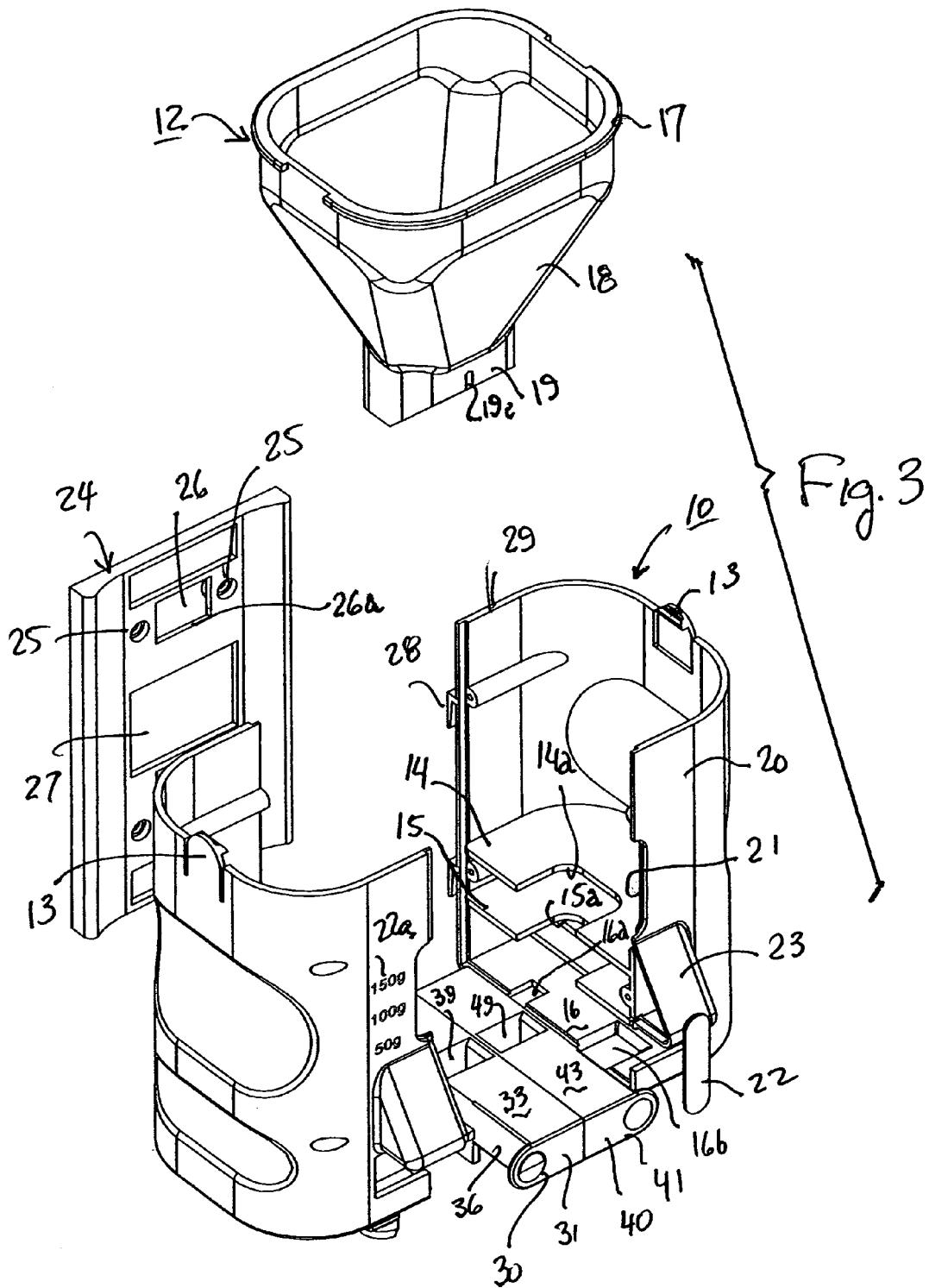
FIG. 3 is an exploded view of the dispenser of FIGS. 1 and 2.

As shown in FIG. 3, the upper end of holder 12 is of a generally rectangular configuration and is formed with a peripheral flange 17 engageable by housing spring clips 13. The side walls of the underlying portion of holder 12 converge inwardly, as shown at 18, so as to direct the flowable material within container 11 to a flow passageway 19 at the lower end of the holder.

The front wall 20 of housing 10 is formed with a vertically-extending rectangular opening 21 closed by a transparent window 22. Window 22 is aligned with a side wall 18 of holder 12, which is of light transparent material so as to enable the level of the flowable material within this portion of the holder to be viewed through the window. Window 22 preferably includes graduation markings 22a, to enable the user to view the level of the flowable material within the dispenser.

The front wall of housing 10 preferably also carries a display panel 23 for displaying advertising or other information.

Housing 10 may be conveniently mounted to a vertical wall by a mounting plate 24 secured to the wall by threaded fasteners passing through openings 25 in the mounting plate. Mounting plate, 24 preferably includes a plurality of cut-outs 26 enabling the plate to uniformly contact the wall. If desired, the center region of mounting plate 24 may also include a two-sided adhesive strip 27 for mounting, e.g. to a ceramic wall. Cut-outs 26 also define upper and lower ledges 26a slightly spaced from the wall, as shown e.g. in FIG. 6a, and adapted to removably receive tabs 28 on the rear wall 29 of housing 10.

The illustrated dispenser further includes two dosing devices 30, 40, movably mounted between horizontal walls 15 and 16 of housing 10. As shown particularly in FIG. 5, each dosing device includes a front wall 31, 41, a rear wall 32, 42, top and bottom wall 33, 34 and 43, 44, and side walls 35, 36 and 45, 46. As shown particularly in FIG. 5, side walls 35 and 45 of the two dosing devices are of a flat configuration and confront each other; whereas side walls 36 and 46 are of a curved configuration and face away from each other.

Side wall 35 of dosing device 30 is formed with a longitudinally-extending rib 37 receivable within a longitudinally-extending recess 47 formed in side wall 45 of dosing device 40, such that each dosing device guides the movement of the other. The front end of recess 47 is closed, as shown at 47', to define a projection engageable with the end of rib 37.

Dosing device 30 may thus be independently moved inwardly of the housing, by manually pressing against its wall 31. However, because of engagement of projection 47' against the end of rib 37, movement of dosing device 40 inwardly of its housing by pressing against its wall 41 will also move with it dosing device 30.

Each dosing device 30, 40, further includes a spring 38, 48 (FIG. 4) interposed between rear wall 32, 42 of the respective dosing device and rear wall 29 of housing 10. The two dosing devices 30, 40, are urged by their springs 38, 48, forwardly of housing 10 to a first limit position at the front of the housing, but are movable by finger-pressure applied to their front walls 31, 41, rearwardly of the housing to a second limit position at the rear of the housing.

Figure 4:
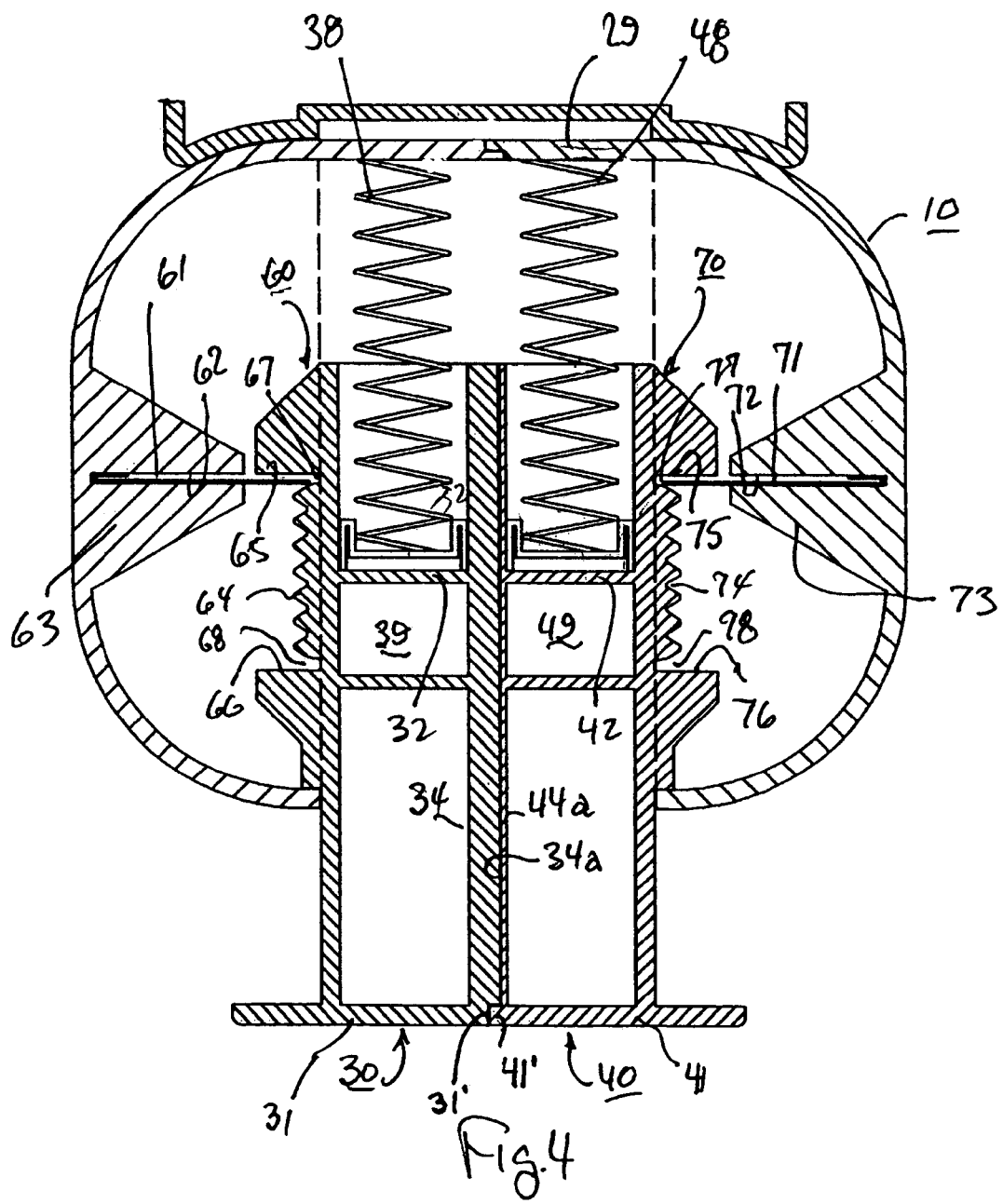
FIG. 4 is a transverse sectional view particularly illustrating the dosing devices in their first limit positions.

As shown particularly in FIGS. 3 and 4, each of the dosing devices, 30, 40, is further formed with a compartment 39, 49 of a predetermined volume, to provide a predetermined measure of the flowable material to be dispensed. Each dosing compartment 39, 49 is open at its upper end such that when the respective disposing device is in its rear limit position, it can receive flowable material from container 11 via flow passageway 19 of holder 12. Each dosing compartment 39, 49 is also open at its lower end such that when the respective dosing device is in its front limit position, it dispenses the quantity of flowable material therein out of the dispenser via a dispensing spout 50 underlying the dosing devices.

Figure 6A:
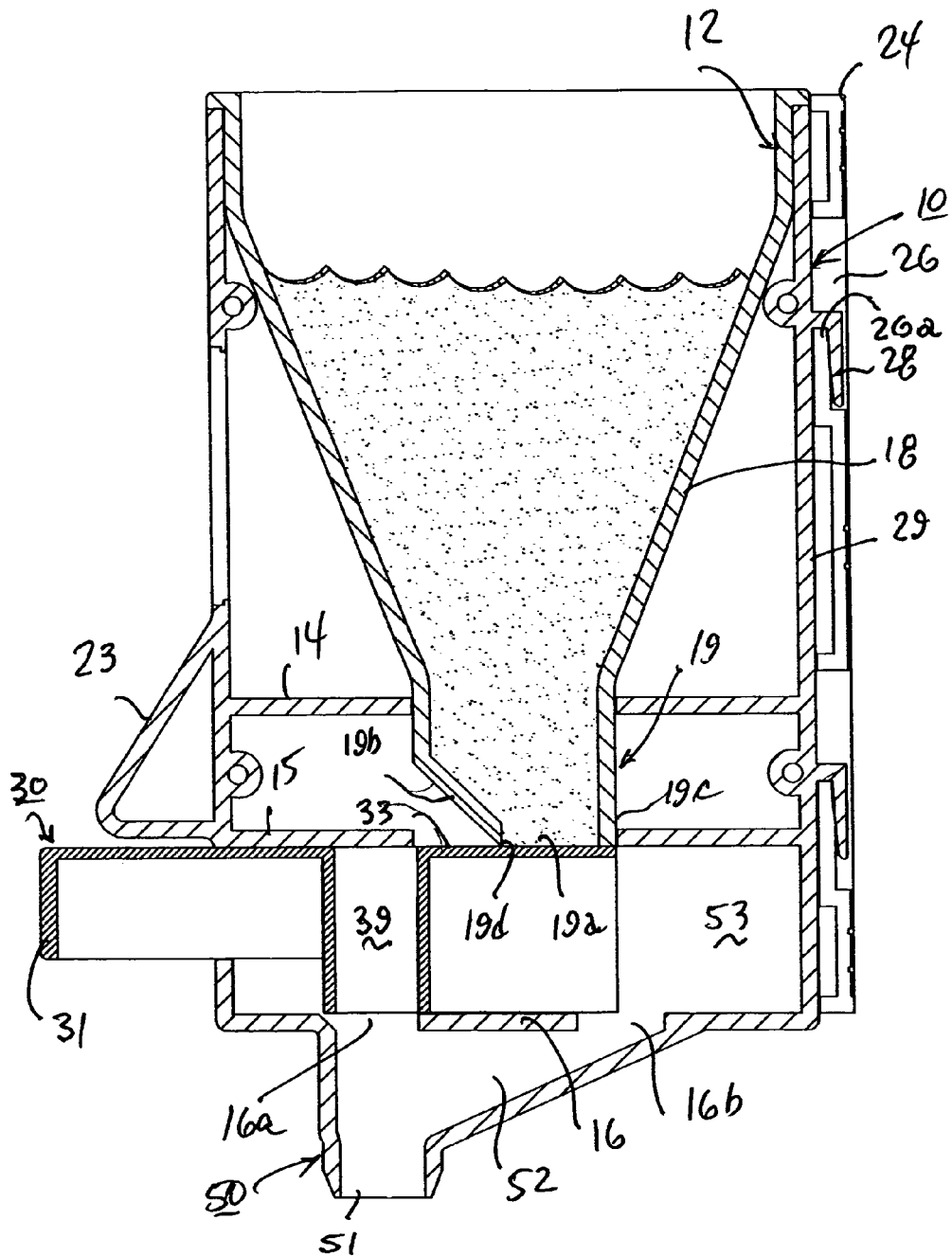
FIGS. 6a-6d illustrate different stages in the operation of the dosing device of FIGS. 1-5.

Flow passageway 19 of the container holder 12 is more particularly illustrated in FIGS. 6a-6d. As shown in FIG. 6a, for example, flow passageway 19 is open at the bottom 19a, and includes a front wall 19b which converges towards the rear wall 19c. The lower edge of the converging front wall 19b is sharpened, as shown at 19d, to provide a relatively sharp scraping edge engaging the top wall 33, 34, of the two dosing devices 30, 40, as they move between their forward and rearward limit positions. A partition 19e (FIG. 3) divides its outlet passageway 19 into two sub-passageways, one alignable with dosing compartment 39 of dosing device 30, and the other alignable with dosing compartment 49 of dosing device 40.

As also seen particularly in FIG. 6a, dispensing spout 50 underlying the two dosing devices 30, 40 includes a main passageway 51 aligned with dosing compartments 39, 49 when the dosing devices are in their front limit positions. Dispensing spout 50 further includes another inclined passageway 52, leading from a space 53, at the rear of the two dosing devices 30, 40, to the main passageway 51. As described more particularly below, any powder scraped off from the upper surfaces of the two dosing devices 30, 40, during their movements from their rear limit positions to their front limit positions will fall, via space 53 and passageway 52, into the main passageway 51 for inclusion with the flowable material dispensed from passageway 51.

Figure 5:
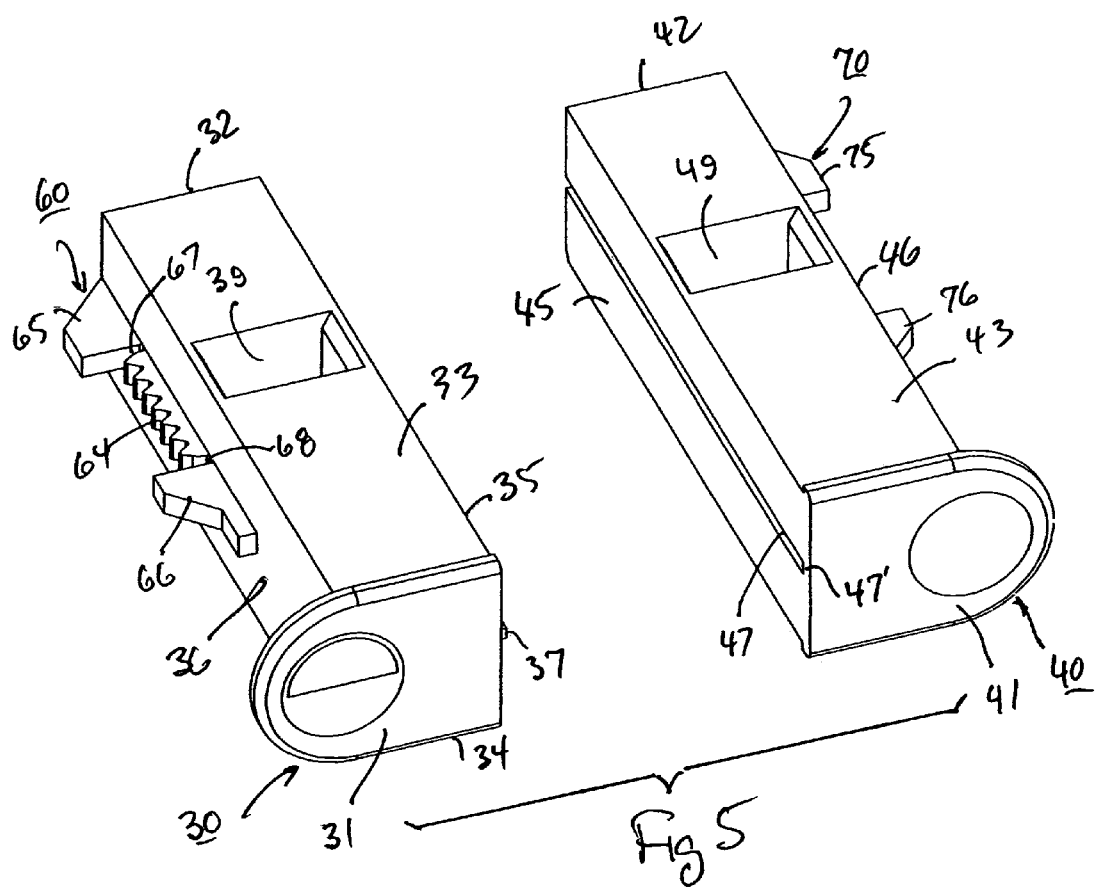
FIG. 5 is an isometric view more particularly illustrating the two dosing devices.

As shown particularly in FIGS. 4 and 5, each of the outwardly-facing curved walls 36, 46 of the two dosing devices 30, 40, includes a toothed attachment 60, 70, respectively. The two attachments 60, 70 are of the same construction and cooperate with leaf springs 61, 71, respectively, (FIG. 4) to perform the following double function: First, each attachment, cooperating with its leaf spring, serves to restrain the movement of its respective dosing device, when starting to move in one direction, from moving in the opposite direction until it has reached its limit of travel. Secondly, each attachment, also cooperating with its respective leaf spring, acts to vibrate the housing during movement of the respective dosing device between its two limit positions, to thereby enhance gravity flow of the flowable material into and out of the respective dosing compartment 39, 49. Both of the foregoing functions are described more particularly below particularly with reference to FIG. 4 and FIGS. 6a-6d.

As shown in FIG. 4, one end of each leaf spring 61, 71, is received within a vertically-extending slot 62, 72, formed in a thickened section 63, 73, of housing 10. The opposite end of each leaf spring 61, 71 is free and is engageable with a toothed, serrated, or ribbed surface 64, 74, of the respective attachment 60, 70, to define a plurality of protrusions and depressions engageable by the free end of the respective leaf spring. Each leaf spring 61, 71, is of a length such that, when its free end engages the bottom of each depression in the ribbed surfaces 64, 74, the spring is slightly flexed in one or the other direction.

As further seen in FIG. 4, the ribbed surfaces 64, 74 of attachments 60, 70 are bordered at their opposite ends by two walls 65, 66 and 75, 76, respectively. Walls 65, 75 are cooperable with their respective leaf spring, 61, 71, to define the front limit positions of the two dosing devices 30, 40. Walls 66, 76 are cooperable with their respective leaf springs 61, 71 to define the rear limit positions of the two dosing devices.

Each attachment 60, 70, further includes a slot 67, 68 and 77, 78, respectively, at the juncture of each wall 65, 66 and 75, 76, respectively, with the ribbed portions 64, 74 of the attachments. Slots 67, 68, 77, 78 are deeper than the depressions of the ribbed surface, 64, 74. They are dimensioned to permit the free end of each leaf spring 61, 71, when arriving in the respective slot, to flip to the opposite flexed direction, and thereby to permit the respective dosing device, after reaching one of its limit positions, to be moved in the opposite direction towards the other limit position.

FIG. 4 illustrates the two dosing devices 30, 40 in their front limit positions. Walls 65 and 75 of the respective attachments 60, 70, define these limit positions since their engagement with the free ends of leaf springs 61, 71, will not permit the dosing devices to be moved forwardly any further. Each dosing device, 30, 40 is normally urged to this front limit position by their respective spring 38, 48.

Each dosing device 30, 40, may be moved inwardly toward the housing rear wall 29, from its front limit position towards its, rear limit position by manually pressing against the front wall 31, 41 of the dosing device. Thus, as dosing device 30 is moved rearwardly, the free end of its spring 61 is flexed outwardly toward housing rear wall 29, and while in this flexed position, sequentially passes over the ribbed portion 64. This movement of the dosing device also causes the free end of the leaf spring to successfully produce a vibratory effect, which is applied to housing 10.

It will thus be seen that each leaf spring, cooperable with its respective attachment, is effective to vibrate the housing during the movement of the dosing device in either direction, to thereby enhance the flow of the flowable material. At the same time, leaf spring restrains its dosing device, after starting to move in one direction, from moving in the opposite direction until the dosing device has completed its movement to the respective limit position, wherein the free end of the leaf spring can seat within the respective slot 67, 68, 77, 78, adjacent to its respective end wall 65, 66, 75, 76. As described above, their slots are dimensioned to permit the springs 61, 71 to flip to the opposite side, and thereby permit the dosing device, after reaching its one limit position, to be moved in the opposite direction towards it other limit position.

The manner of using the illustrated dispenser will be apparent from the above description.

Thus, the dispenser may be loaded with a bulk quantity of the flowable material to be dispensed (e.g., baby formula powder) by inserting the original container 11 of such into holder 12 at the upper end of the dispenser. Such original containers are generally in different container configurations, and therefore the dispenser may be provided with an adaptor for each configuration of the commonly used original containers.

Holder 12 is releasably retained within holder 10 of the dispenser by clips 13. The holder may be conveniently removed, e.g. for cleaning or replacement, by merely pressing clips 13 outwardly.

Holder 12, with the container 11 therein, is inserted into housing 10 to the position illustrated in FIG. 6a, wherein the flow passageway section 19 at the bottom of the holder is received within openings 14a, 15a of the two horizontal walls 14, 15, such that the lower scraping 19d of the holder engages the upper walls 33, 43 of the two dosing devices, 30, 40. FIG. 6a illustrates dosing device 30 in its front limit position. This will also be case of dosing device 40 since both dosing devices ate normally urged to their front limit positions by their respective springs 38, 48 (FIG. 4).

Whenever it is desired to dispense a single dosage of the flowable material (e.g., baby formula), front wall 31 of dosing device 30 is pressed inwardly to move the dosing device to its rear limit position, and then released, whereupon spring 38 returns the dosing device to its front limit position. The foregoing operations are more particularly illustrated in FIGS. 6a-6d.

Figure 6B:
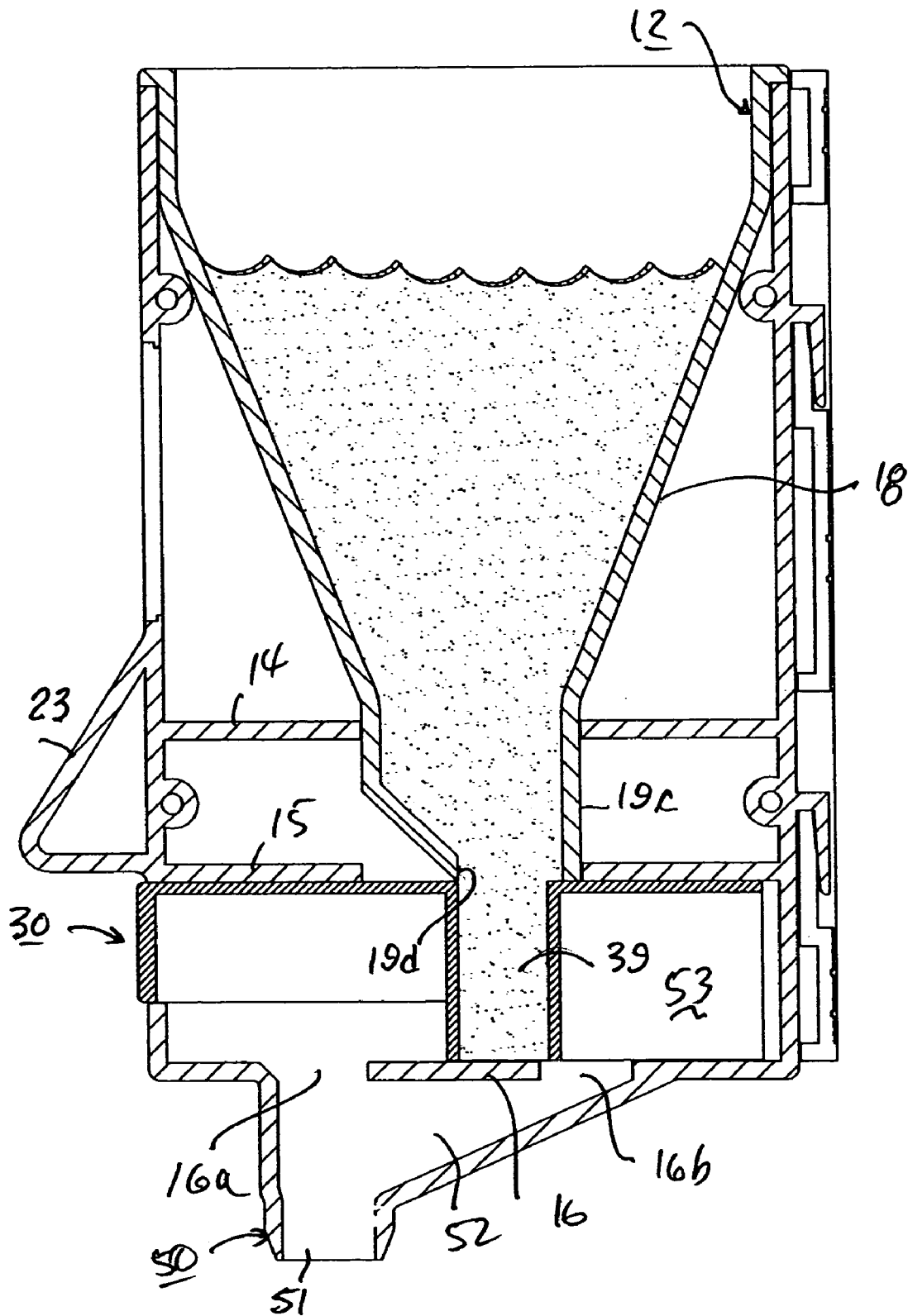
Figure 6C:
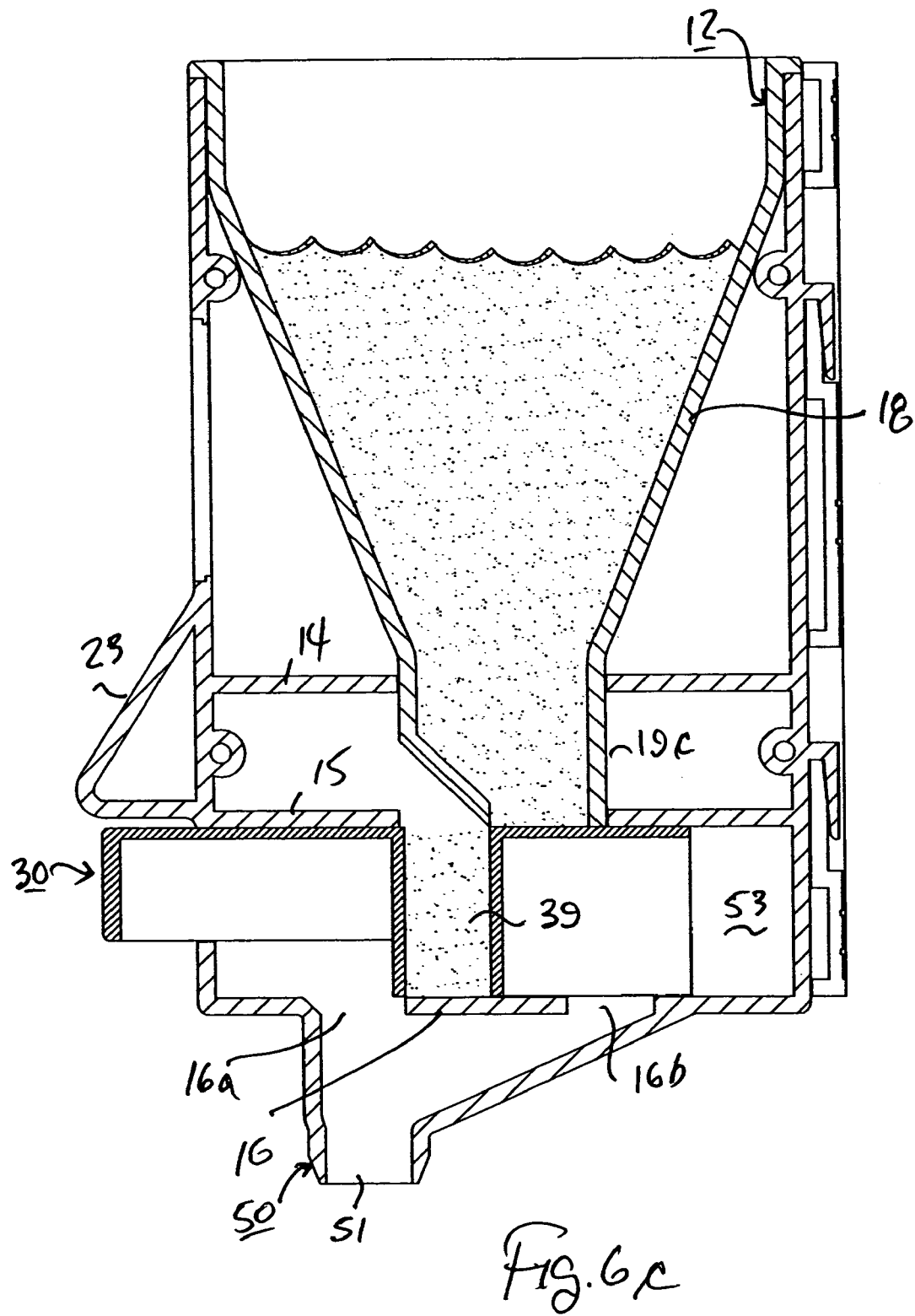
Figure 6D:
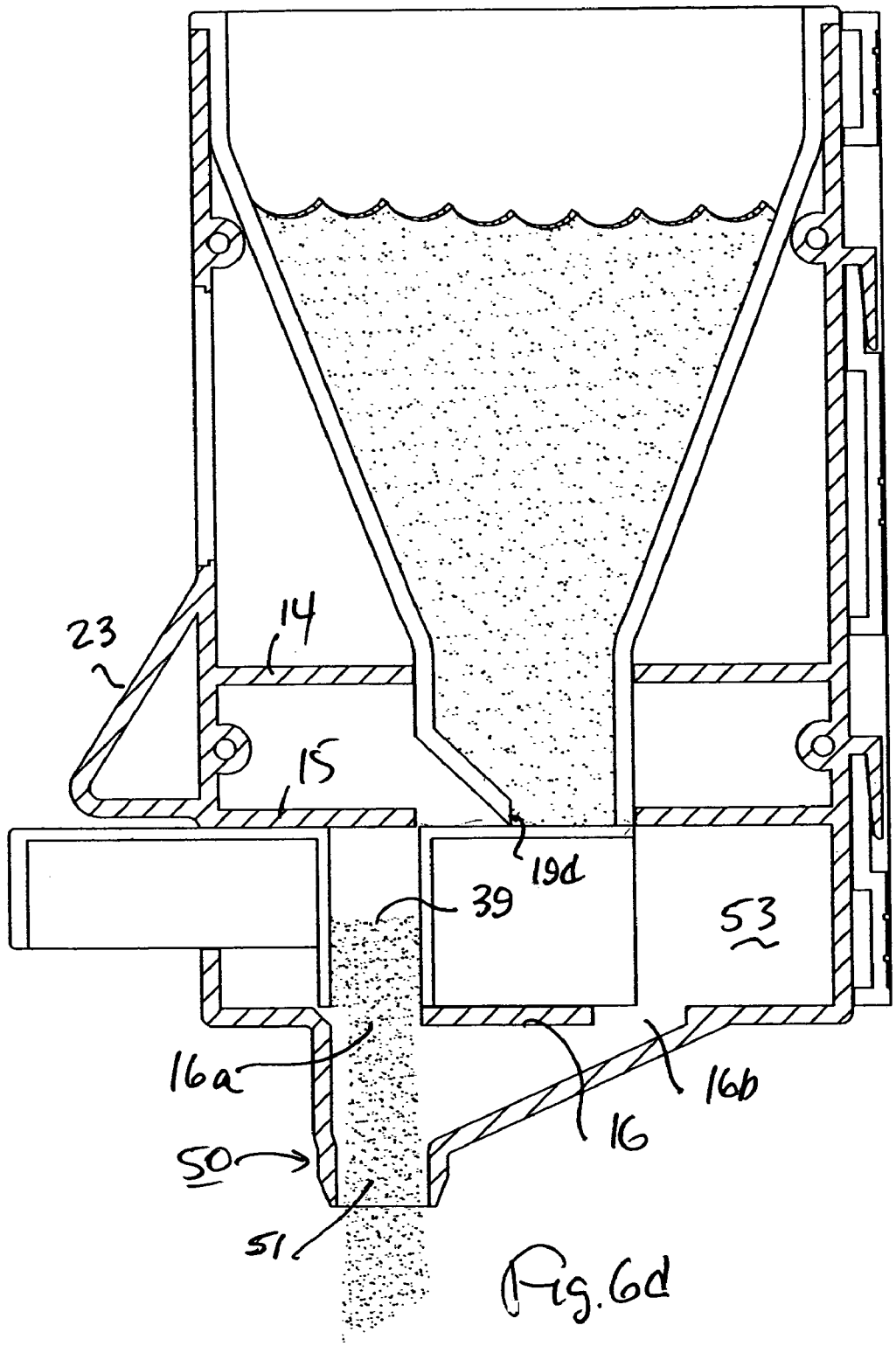

Thus, FIG. 6a illustrates the front limit position of dosing device 30, wherein its dosing compartment 38 is aligned with passageway 51 of dispensing spout 50. FIG. 6b illustrates dosing device 30 in its rear limit position, wherein its dosing compartment 39 is aligned with flow passageway 19 of holder 12 within housing 10 as to receive, by gravity flow, a quantity of the flowable material within the housing. FIG. 6c illustrates the dosing device during its return movement, towards its front limit position, under the action of its spring 38, wherein it will be seen that the dosing compartment 39 is about to arrive at the outlet passageway 51 of spout 50. FIG. 6d illustrates the dosing device 30 after having returned to its front limit position wherein its dosing compartment 39 has become aligned with outlet passageway 51 of spout 50 so as to dispense, by gravity flow, the contents of compartment 39 via the outlet spout 50.

As indicated earlier, during this return movement of dosing device 30 toward its front limit position shown in FIG. 6d, scraping edge 19d at the lower end of holder 12 within housing 10, scrapes any material clinging to upper wall 33 of dosing device 30 into space 53. This which scraped-away material is directed by passageway 52 to the material dispensed via spout 50.

Thus, if only one dosage of the flowable material is to be dispensed, dosing device 30 would be actuated in the manner described above by manually pressing inwardly from wall 31. On the other hand, if two dosages of the flowable material are to be dispensed, dosing device 40 would be actuated by pressing inwardly its front wall 41. The projection 47' (FIG. 5) defined by the end of recess 47 in wall 45 of dosing device 40, engageable with the end of rib 37 in wall 35 of dosing device 30, would thereby cause dosing device 30 to be moved with dosing device 40 to their rear limit positions. This can also be done by providing front wall 41 of dosing device 40 with a projecting flange, as shown at 41', FIG. 4, seatable within a recess 31' in wall 31 of dosage device 30. The return movements of both dosing devices is effected by their respective springs 38, 48.

During the above-described movement of dosing device 30 and/or dosing device 40, the two leaf springs 61, 71, acting on their respective attachments 60, 70 (as shown, in FIG. 4) perform the following two functions:

First, each leaf spring acting on its respective attachment is effective, when the respective dosing device has been moved from its front limit position towards its rear limit position, to restrain movement of the dosing device back to its front limit position until it has first completed its movement to the rear limit position. As described earlier, this function is effected by the construction wherein the free end of each leaf spring, received within the ribbed portion of the respective attachment 60, 70, is slightly flexed in one direction (rearwardly, FIG. 4) as soon as its respective dosing device is moved in that direction, i.e. towards the rear wall 29 of housing 20. Such flexing of the leaf spring causes it to restrain any return movement of the dosing device until the free end of the leaf spring has become seated in the end slot (e.g. 68, FIG. 4) at the opposite end of the respective attachment. As also indicated above, end slots 65, 66, 75, 76 are dimensioned to permit each leaf spring to unflex to its normal form. These slots thereby permit the respective dosing device to be moved in the opposite direction by its respective return spring (e.g. 38). This function of the leaf springs 61, 71 and attachments 60, 70, thus prevent dispensing of less than the desired predetermined quantity of the flowable material by only a partial filling of the respective dosing compartment 39, 49.

The second function performed by leaf springs 61, 71, acting on their respective attachments 60, 70, is a vibratory function, in that the movement of the free end of the leaf springs over the projections and depressions of the ribbed portions 68, 78, imparts a vibratory action to the housing 10. This vibratory action produced during the movement of the dosing devices 30, 40 to their rear limit positions and to their front limit positions enhances the gravity flow. It thereby better assures a complete filling of the dosing compartment 39, 49 in the rear limit positions of the two dosing devices (FIG. 6b), and a complete emptying of the dosing compartments in the front limit positions of the two dosing devices (FIG. 6d).

As also indicated above, the lower scraping edge 19d engageable with the upper surfaces the two dosing devices 30, 40, during their movements from their rear limit positions to their front limit positions, is effective to scrape any particles clinging to the upper surfaces of the dosing devices into the space 53 at the rear side of housing 10. Such scraped-away particles are joined, via passageway 52, to the flowable material dispensed via dispensing spout 50. The foregoing feature prevents the accumulation of any flowable material within the dispenser, and thereby better assures freshness of the dispensed product, as well as a reduction in the need for frequent cleaning of the dispenser.

Figure 7:
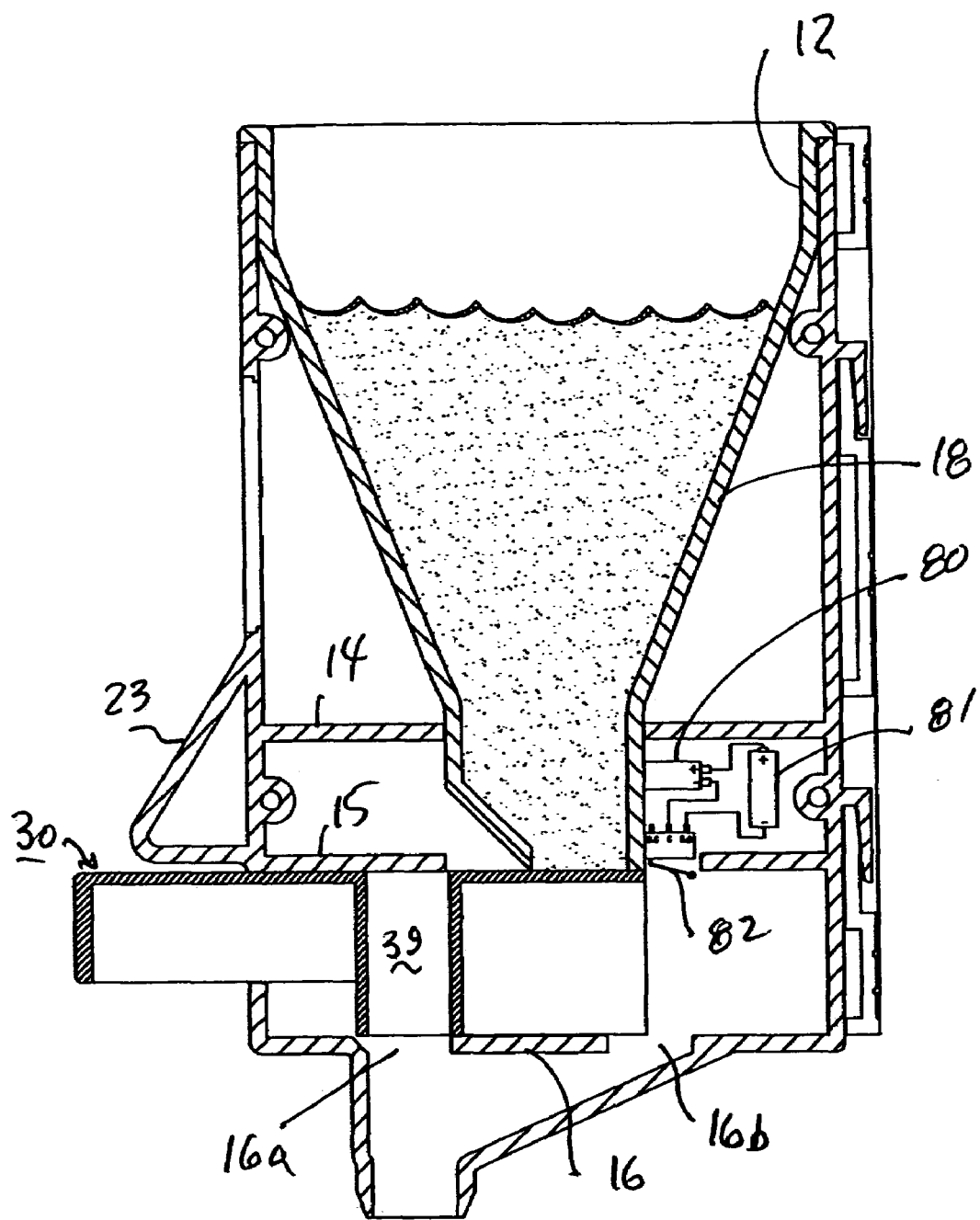
FIG. 7 illustrates the above-described dosing dispenser-modified to include an electrical vibrator.

FIG. 7 illustrates a dosing dispenser as described above but modified to also include an electrically-energized vibrator, to better assure complete filling and emptying of the dosing compartments of the dosing devices.

Thus, as shown in FIG. 7, the illustrated dispenser includes an electrical vibrator 80 electrically energized by battery 81 and controlled by an electrical switch 82. Electrical switch 82 overlies the top wall 35 of dosing device 30. It is normally open, but is automatically closed by top wall 35 as soon as dosing device 30 is moved away from its front limit position, and remains closed until it is returned to its front limit position. Thus, vibrator device 80 will be effective to vibrate the dispenser, particularly holder 12 feeding the flowable material to the dosing devices 30, 40, at all times when dosing device 30 is away from its front limit position. Such an arrangement better assures complete filling of the dosing compartments when the two dosing devices are moved to their rear limit positions, and complete emptying of the dosing devices when they are returned to their front limit positions.

In all other respects, the dispenser illustrated in FIG. 7 is constructed and operated in the same manner as described above, and therefore the same reference numerals have been used for corresponding parts to facilitate understanding.

While the invention has been described above with respect to preferred embodiments for dispensing baby formula, it will be appreciated that the invention could be used in many other applications for dispensing other types of flowable materials, e.g., sugar, coffee, soap, etc. Many other variations, modifications and applications of the invention will also be apparent.

What is claimed is:

1. A dosing dispenser for dispensing predetermined quantities of a flowable material, comprising:
    a housing for receiving a bulk quantity of the flowable material and including a flow passageway for the flowable material;
    and a dosing device underlying said flow passageway and manually movable from a first limit position to a second limit position, and then movable back to said first limit position;
    said dosing device including a dosing compartment located to align its upper end with said flow passageway of the housing when the dosing device is in said second limit position for filling with said flowable material, and to dispense the flowable material from the housing through the lower end of the dosing compartment when the dosing device is moved back to said first limit position;
    said dosing dispenser further comprising a restraining device effective when said dosing device has been moved away from said first limit position towards said second limit position, to restrain a return movement of the dosing device back to said first limit position until the dosing device has first completed its movement to said second limit position, to thereby prevent dispensing less than the predetermined quantity of the flowable material by only a partial filling of the dosing compartment.

2. The dispenser according to claim 1, wherein said restraining device includes a leaf spring secured at one end to said housing and having a free end extending substantially perpendicularly to and engageable with a surface of said dosing device, said leaf spring being dimensioned such that it is slightly flexed when the dosing device is moved in one direction while engaged with said free end of the leaf spring, whereby the leaf spring permits further movement of the dosing device in only said one direction until the dosing device reaches the respective limit position.

3. The dispenser according to claim 2, wherein said surface of the dosing device engaged by the free end of said leaf spring is formed with a slot at each of its said limit positions, each of said slots being dimensioned to permit the leaf spring to be flexed in the opposite direction at such limit position so as to permit the dosing to be moved in the opposite direction only after reaching the respective limit position.

4. The dispenser according to claim 3, wherein each of said slots is formed with an end wall engageable by said free end of the leaf spring to define said limit position of the dosing device.

5. The dispenser according to claim 3, wherein the surface of said dosing device engaged by the free end of the leaf spring is formed with a plurality of protrusions and depressions so as to produce, when moving between its limit positions, a vibratory action in the housing to enhance gravity flow of the flowable material into and out of said dosing compartment.

6. The dispenser according to claim 1, wherein said dosing device includes a spring which is loaded when the dosing device is manually moved from said first limit position to said second limit position, and which returns the dosing device from said second limit position to said first limit position.

7. The dispenser according to claim 1, wherein the dispenser further comprises a second dosing device contiguous to one side of the first-mentioned dosing device, said second dosing device being of the same construction as said first dosing device except that it includes a projection engageable with the first-mentioned dosing device during the movement of said second dosing device from said first limit position to said second limit position, such that manually moving the first-mentioned dosing device dispenses only the quantity of flowable material in the dosing compartment of the first-mentioned dosing device, whereas manually moving said second dosing device dispenses the quantity of flowable material in the dosing compartments of both said dosing devices.

8. The dispenser according to claim 7, wherein said projection in the second dosing device engages the first-mentioned dosing device such that the first-mentioned dosing device is move by said second dosing device only from said first limit position to said second limit position, each of said dosing devices including a return spring for returning the dosing devices to their first limit positions.

9. The dispenser according to claim 1, wherein said housing further comprises a light-transmissive window including graduation markings indicating the level of the flowable material within said receptacle.

10. The dispenser according to claim 1, wherein said dispenser further compresses an outlet spout underlying said dosing device for dispensing the flowable material from said housing when the dosing device has been moved back to said first limit position.

11. A dosing dispenser for dispensing predetermined quantities of a flowable material, comprising:
 a housing for receiving a bulk quantity of the flowable material and including a flow passageway for the flowable material;
 a dosing device underlying said flow passageway and manually movable from a first limit position to a second limit position, and then movable back to said first limit position;
 said dosing device including a dosing compartment located to align upper end with said flow passageway of the housing when the dosing device is in said second limit position for filling with said flowable material, and to dispense the flowable material from the housing through the lower end of the dosing compartment when the dosing device has moved back to said first limit position;
 and a vibrator device effective to vibrate said housing during the movement of the dosing device between its limit positions so as to enhance the flow of the flowable material into and out of said dosing compartment;
 said vibrator device includes a leaf spring secured at one end to said housing and having a free end engageable with a surface of said dosing device formed with projections and depressions, such that the engagement of said leaf spring with said projections and depressions during the movement of the dosing device between its limit positions produces a vibrating action in said housing.

12. The dispenser according to claim 11, wherein one end of said leaf spring is secured to said housing and includes a free end engageable with said surface of the dosing device formed with said projections and depressions.

13. The dispenser according to claim 12, wherein said leaf spring is dimensioned such that it is slightly flexed by the engagement of its free end with the dosing device, and thereby permits movement of the dosing device in only one direction until it reaches one of its limit positions.

14. The dispenser according to claim 13, wherein said surface of the dosing device engaged by said leaf spring is formed with a slot at each of its said limit positions, each of said slots being dimensioned to permit the leaf spring to be flexed in the opposite direction at such limit position so as to permit the dosing device, when moved in one direction towards one limit position, to be moved in the opposite direction only after reaching said one limit position.

15. The dispenser according to claim 14, wherein each of said slots is formed with an end wall engageable by said free end of the leaf spring to define said limit position of the dosing device.

16. The dispenser according to claim 11, wherein said vibrator device includes an electrical device which is electrically energized by the movement of said dosing device from its first limit position.

17. A dosing dispenser for dispensing predetermined quantities of a flowable material, comprising:
 a housing for receiving a bulk quantity of the flowable material and includes a flow passageway for the flowable material;
 and a dosing device underlying said flow passageway and manually movable from a first limit position to a second limit position, and then movable back to said first limit position;
 said dosing device including a dosing compartment located to align its upper end with said flow passageway of the housing when the dosing device is in said second limit position for filling with said flowable material, and to dispense the flowable material from the housing through the lower end of the dosing compartment when the dosing device is moved back to said first limit position;
 said dispenser including a second dosing device contiguous to one side of the first-mentioned dosing device, said second dosing device including a second dosing compartment, and a projection engageable with the first-mentioned dosing device during the movement of said second dosing device from said first limit position to said second limit position, such that manually moving the first-mentioned dosing device dispenses only the quantity of flowable material in the dosing compartment of the first-mentioned dosing device, whereas manually moving said second dosing device dispenses the quantity of flowable material in the dosing compartments of both of said dosing devices.

18. The dispenser according to claim 17, wherein said projection in the second dosing device engages the first-mentioned dosing device such that the first-mentioned dosing device is moved by said second dosing device only from said first limit position to said second limit position, each of said dosing devices including a return spring for returning the dosing devices to their first limit positions.

19. The dispenser according to claim 17, wherein each of said dosing devices includes projections and depressions engageable by a leaf spring fixed at one end to said housing to produce a vibratory action in said housing as each of said dosing devices moves between said limit positions to thereby enhance the flow of the flowable material into and out of said dosing compartments.

* * * * *